(12) United States Patent
Seo et al.

(10) Patent No.: US 10,536,739 B2
(45) Date of Patent: Jan. 14, 2020

(54) DISPLAY APPARATUS AND CONTROL METHOD THEREOF

(71) Applicant: SAMSUNG ELECTRONICS CO., LTD., Suwon-si (KR)

(72) Inventors: Je-hwan Seo, Daegu (KR); Seung-il Yoon, Yongin-si (KR); Jae-myung Hur, Seongnam-si (KR); Kwan-young Kim, Suwon-si (KR); Dong-wook Kim, Suwon-si (KR); Min-sup Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/709,894

(22) Filed: Sep. 20, 2017

(65) Prior Publication Data

US 2018/0192107 A1 Jul. 5, 2018

Related U.S. Application Data

(60) Provisional application No. 62/442,150, filed on Jan. 4, 2017.

(30) Foreign Application Priority Data

Jan. 4, 2017 (KR) .......................... 10-2017-0001617
May 16, 2017 (KR) .......................... 10-2017-0060694

(51) Int. Cl.
*H04N 21/2665* (2011.01)
*H04N 21/442* (2011.01)
(Continued)

(52) U.S. Cl.
CPC ... *H04N 21/2665* (2013.01); *H04N 21/43615* (2013.01); *H04N 21/43635* (2013.01); *H04N 21/44222* (2013.01)

(58) Field of Classification Search
CPC ....... H04N 21/43635; H04N 21/44222; H04N 21/431; H04N 5/4403; H04N 21/42225;
(Continued)

(56) References Cited

U.S. PATENT DOCUMENTS 8,266,335 B2 9/2012 Kitano et al.
2008/0088495 A1* 4/2008 Kawakita ......... H04N 21/43635
348/734
(Continued)

FOREIGN PATENT DOCUMENTS

JP 2007-134956 A 5/2007
JP 2008-67284 A 3/2008
(Continued)

*Primary Examiner* — Hai V Tran
(74) *Attorney, Agent, or Firm* — Sughrue Mion, PLLC

(57) ABSTRACT

A display apparatus and a method. The display apparatus may include a display, an interface configured to be connected with an output terminal of a source device, a main processor configured to control an operation of the display apparatus and a sub-processor configured to identify whether the output terminal of the source device is connected with the interface. The main processor may identify whether the source device is turned on if the display apparatus is in a first state, and the sub-processor may identify whether the source device is turned on if the display apparatus is in a second state. The main processor may control the display to display a UI based on one or more of whether the interface is connected to the output terminal of the source device and whether the source device is turned on.

23 Claims, 14 Drawing Sheets

(51) Int. Cl.
*H04N 21/4363* (2011.01)
*H04N 21/436* (2011.01)

(58) Field of Classification Search
CPC ......... H04N 21/42226; H04N 21/2665; G09G 2370/12
See application file for complete search history.

(56) References Cited

U.S. PATENT DOCUMENTS

| | | | |
|---|---|---|---|
| 2009/0027555 A1* | 1/2009 | Hanko | H04N 21/4622 348/569 |
| 2010/0073560 A1* | 3/2010 | Kitano | H04N 21/44227 348/554 |
| 2010/0079432 A1* | 4/2010 | Kang | G09G 5/00 345/211 |
| 2010/0165197 A1 | 7/2010 | Hattori | |
| 2011/0019225 A1* | 1/2011 | Jung | G06F 1/3209 358/1.15 |
| 2011/0239022 A1* | 9/2011 | Tokoro | G06F 1/266 713/323 |
| 2013/0009932 A1* | 1/2013 | Choi | G09G 5/003 345/211 |

FOREIGN PATENT DOCUMENTS

| | | |
|---|---|---|
| KR | 2003-0093467 A | 12/2003 |
| KR | 10-2006-0091177 A | 8/2006 |

* cited by examiner

FIG. 7B

| | FIRST STATE | SECOND STATE → | FIRST STATE → |
|---|---|---|---|
| CASE 1 | CONNECTED o | CONNECTED o → CONNECTED x | UI INFORMING THAT CONNECTION STATE NEED TO BE CHECKED |
| CASE 2 | CONNECTED o | CONNECTED o → CONNECTED o | GENERAL UI |
| CASE 3 | CONNECTED o | CONNECTED x → CONNECTED o | AUTOMATIC DETECTION |
| CASE 4 | CONNECTED x | CONNECTED x → CONNECTED x | NO OPERATION |
| CASE 5 | CONNECTED x | CONNECTED x → CONNECTED o | AUTOMATIC DETECTION |
| CASE 6 | CONNECTED x | CONNECTED o → CONNECTED x | UI INFORMING THAT CONNECTION STATE NEED TO BE CHECKED |

DISPLAY APPARATUS AND CONTROL METHOD THEREOF

CROSS-REFERENCE TO RELATED APPLICATION

This application claims priority from Korean Patent Application No. 10-2017-0060694, filed in the Korean Intellectual Property Office on May 16, 2017, Korean Patent Application No. 10-2017-0001617, filed in the Korean Intellectual Property Office on Jan. 4, 2017, and U.S. Provisional Application No. 62/442,150, filed in the U.S. Patent and Trademark Office on Jan. 4, 2017, the disclosures of which are incorporated herein by references in their entireties.

BACKGROUND

1. Field

An apparatus and a method consistent with aspects of exemplary embodiments broadly relates to a display apparatus and a control method thereof, and more particularly, to a display apparatus which provides information about a source device connected to the display apparatus and a control method thereof.

2. Description of Related Art

With the development of electronic technology, various types of display apparatuses have been developed and distributed. Particularly, a TV such as a smart TV, etc. can receive a plurality of contents from a plurality of source devices and display one of the contents.

While receiving and displaying content, a user command for changing a source device which provides the content can be input, and sometimes, content might not be provided according to the state of a newly connected source device.

For example, a user command for viewing content provided from a DVD player can be input while a user is viewing the content provided from a set-top box. If the DVD player is not connected with a TV or the DVD player is turned off, a user cannot view the content provided from the DVD player. Accordingly, the TV needs to provide information about the state of the DVD player to a user.

In other words, while a TV displays content received from a source device, it is required to identify an operation state of another source device.

Also, in a case of changing a source device to connect with another source device while a TV is in a standby mode, the TV cannot recognize that a source device has been changed.

SUMMARY

An aspect of exemplary embodiments broadly relates to a display apparatus which displays information about whether a display apparatus is connected with a source device and whether a source device is turned on and a control method thereof.

According to an aspect of an exemplary embodiment, a display apparatus may include a display, an interface configured to be connected with an output terminal of a source device, a main processor configured to control an operation of the display apparatus and a sub-processor configured to identify whether the output terminal of the source device is connected with the interface. The main processor may identify whether the source device is turned on if the display apparatus is in a first state, and the sub-processor may identify whether the source device is turned on if the display apparatus is in a second state. The main processor may control the display to display a UI based on one or more of whether the interface is connected and whether the source device is turned on.

The display apparatus may further include a storage, and if a connection state of the interface is changed while the display apparatus is in the second state, the sub-processor may store information about the connection state of the interface in the storage, and the main processor may automatically identify the source device based on the information about the connection state of the interface to the output terminal of the source device if the display apparatus is changed from the second state to the first state.

The main processor may display one UI from among a first UI which indicates that the output terminal of the source device is not connected with the interface, a second UI which indicates that the output terminal of the source device is connected with the interface and the source device is turned off, and a third UI which indicates that the output terminal of the source device is connected with the interface and the source device is turned on.

The main processor may identify whether the source device is turned on based on a video signal and a clock signal which are input from the source device via the interface if the display apparatus is in the first state, and the sub-processor may identify whether the source device is turned on based on the clock signal if the display apparatus is in the second state.

The display apparatus may further include a storage, and the sub-processor may store, in the storage, while the display apparatus is in the second state, information about whether the interface is connected and about whether the source device is turned on, and the main processor may display the UI based on the information stored in the storage if the display apparatus is changed back from the second state to the first state.

The display apparatus may further include a communicator, and a control code set controlling the source device which is stored in the storage and which may be transmitted to a remote control device through the communicator if the display apparatus is changed from the second state to the first state while the source device is turned off.

The main processor may display a UI controlling the source device if the display apparatus is changed from the second state to the first state while the source device is turned off.

The interface may be an input terminal, which may include a plurality of pins, and the sub-processor may identify that the output terminal of the source device is connected with the interface if a grounded second pin among the plurality of pins is shorted with a first pin among the plurality of pins and the first pin is grounded.

The first state may be a state in which the main processor and the sub-processor are activated, and the second state may be a state in which the main processor is deactivated and the sub-processor is activated.

The interface may communicate based on a high definition multimedia interface (HDMI) standard.

According to yet another aspect of an exemplary embodiment, a method of controlling a display apparatus with a main processor and a sub-processor is provided. The method may include identifying whether an output terminal of a source device is connected with an interface provided in the display apparatus by the sub-processor, identifying whether the source device is turned on by the main processor if the display apparatus is in a first state, and identifying whether the source device is turned on by the sub-processor if the display apparatus is in a second state, and displaying a UI based on one or more of whether the interface is connected to the output terminal of the source device and whether the source device is turned on.

The method may further include, if a connection state of the interface is changed while the display apparatus is in the second state, storing, in a storage, information about the connection state of the interface with respect to the output terminal of the source device, and automatically identifying the source device based on the information about the connection state of the interface if the display apparatus is changed from the second state to the first state.

The displaying a UI may include displaying one UI from among a first UI which indicates that the output terminal of the source device is not connected with the interface, a second UI which indicates that the output terminal of the source device is connected with the interface and the source device is turned off, and a third UI which indicates that the output terminal of the source device is connected with the interface and the source device is turned on.

The identifying whether the source device is turned on may include identifying whether the source device is turned on by the main processor based on a video signal and a clock signal which are input from the source device via the interface if the display apparatus is in the first state, and identifying whether the source device is turned on by the sub-processor based on the clock signal if the display apparatus is in the second state.

The method may further include storing, in a storage, information about whether the interface is connected to the output terminal of the source device and whether the source device is turned on, while the display apparatus is in the second state, and the displaying the UI may include displaying the UI based on the information stored in the storage if the display apparatus is changed from the second state to the first state.

The method may further include transmitting a control code set controlling the source device to a remote control device if the display apparatus is changed from the second state to the first state while the source device is turned off.

The method may further include displaying another UI controlling the source device if the display apparatus is changed from the second state to the first state while the source device is turned off.

The interface may be an input terminal including a plurality of pins, and the identifying whether the interface is connected to the output terminal of the source device may include identifying that the output terminal of the source device is connected with the interface if a grounded second pin from among the plurality of pins is shorted with a first pin from among the plurality of pins and the first pin is grounded.

The first state may be a state in which the main processor and the sub-processor are activated, and the second state may be a state in which the main processor is deactivated and the sub-processor is activated.

The interface may communicate based on a high definition multimedia interface (HDMI) standard.

According to the various exemplary embodiments, the display apparatus may provide information about the state of a source device by displaying the information about whether the display apparatus is connected with the source device and whether the source device is turned on, thereby improving user convenience.

BRIEF DESCRIPTION OF THE DRAWINGS

These and/or other aspects will become more apparent and more readily appreciated from the following description of exemplary embodiments, taken in conjunction with the accompanying drawings. Understanding that these drawings depict only exemplary embodiments and are not therefore to be considered to be limiting of the scope of the disclosure, the principles herein are described and explained with additional specificity and detail through the use of the accompanying drawings, in which:

FIGS. 7A and 7B are flow diagrams illustrating an automatic identification performed by a display apparatus according to various exemplary embodiments;

DETAILED DESCRIPTION OF EXEMPLARY EMBODIMENTS

Hereinafter, exemplary embodiments will be described in more detail with reference to the accompanying drawings.

Figure 1:
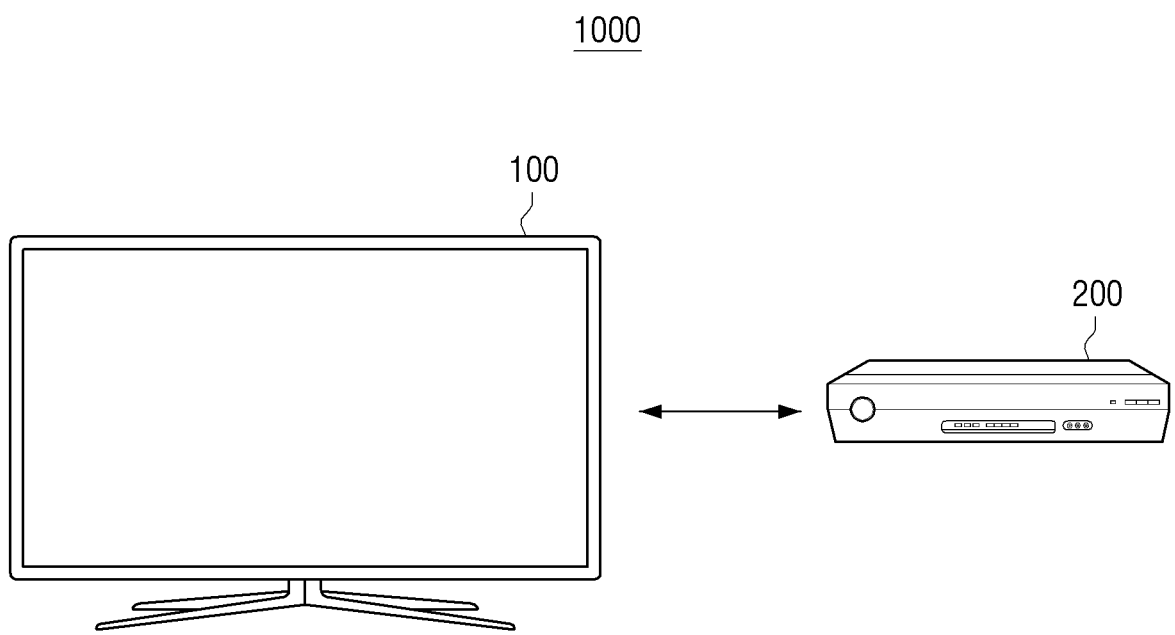
FIG. 1 is a view illustrating a display system according to an exemplary embodiment.

FIG. 1 is a view illustrating a display system according to an exemplary embodiment. According to FIG. 1, the display system 1000 may include a display apparatus 100 and a source device 200.

The display apparatus 100 may include one or more display(s), and be configured to execute an application or display content. Some examples of the display apparatuses may include a digital television, a tablet, a personal computer (PC), a portable multimedia player (PMP), a personal digital assistant (PDA), a smart phone, a cell phone, a digital frame, a digital signage, a kiosk or the like.

The display apparatus 100 may be implemented by a television such as a smart TV, and receive content through various interfaces. For example, the display apparatus 100 may include a tuner, and receive broadcast data of a certain frequency band. The display apparatus 100 may also be connected with a set-top box and receive content from the set-top box. The display apparatus 100 may include interfaces of such a standard as DVI, D-SUB, HDMI, USB, and receive content through each interface.

The display apparatus 100 may be connected with the source device 200, and identify whether the source device 200 is connected and whether the source device 200 is turned on. The display apparatus 100 may display a UI according to whether the source device 200 is connected and whether the source device 200 is turned on. The display apparatus 100 may display content received from the source device 200.

The display apparatus 100 may be connected with a plurality of source devices 200 and receive a plurality of contents from each of the plurality of source devices 200. The display apparatus 100 may identify the source device 200 which is configured to transmit content.

For example, while content received from a first source device is displayed, the display apparatus 100 may identify that a second source device and a third source device are not providing content to the display apparatus 100 but a fourth source device is providing content to the display apparatus 100.

The source device 200 may be connected with the display apparatus 100, and provide content to the display apparatus 100. The source device 200 may be a broadcast receiving device such as a set-top box, etc., or may be a DVD player, etc. An exemplary embodiment of the source device 200 is not limited to the above examples, but the source device 200 may be implemented by any device which can provide content to the display apparatus 100.

Figure 2A:
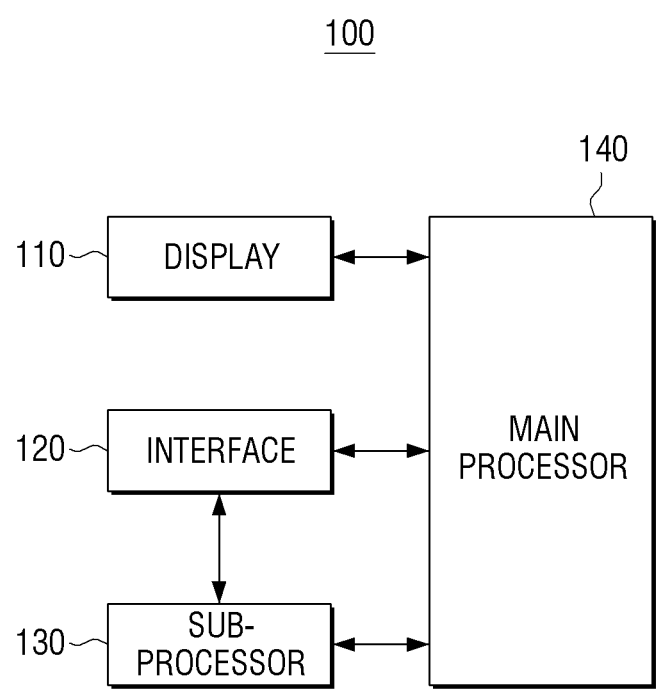
FIG. 2A is a block diagram illustrating a display apparatus according to an exemplary embodiment.

FIG. 2A is a block diagram illustrating a display apparatus according to an exemplary embodiment. According to FIG. 2A, the display apparatus 100 may include a display 110, an interface 120, a sub-processor 130 and a main processor 140.

The display 110 may display information about whether the source device 200 is connected to the display 110 and whether the source device 200 is turned on. The display 110 may also display content received from the source device 200.

The display 110 may be implemented by a liquid crystal display panel (LCD), an organic light emitting diodes (OLED), etc., but is not limited thereto. Further, the display 110 may be implemented as a flexible display, a transparent display, etc. in some cases.

The interface 120 may be connected with an output terminal of the source device 200. For example, the interface 120 may be an interface which communicates in accordance with a high definition multimedia interface (HDMI) standard, and be connected with the output terminal of the source device 200 according to the HDMI standard.

However, it is not limited to the above example, but the interface 120 may be implemented based on any standard which can receive content from the source device 200.

The sub-processor 130 may be configured to operate with lower power than the power used by the main processor 140, and may be implemented by a Micom (Micro-computer), etc. The sub-processor 130 may process some of the functions of the display apparatus 100 with low power.

The sub-processor 130 may identify whether an output terminal of the source device 200 is connected with the interface 120. For example, the sub-processor 130 may identify whether an output terminal of the source device 200 is physically connected to the interface 120.

If the connection state of the interface 120 is changed while the display apparatus is in the second state, the sub-processor 130 may store information about the connection state of the interface 120 in the storage such as a memory (not illustrated).

For example, the sub-processor 130 may identify that the output terminal of the source device 200 is disconnected from the interface 120, and then, reconnected to the interface 120 in the second state. Also, the sub-processor 130 may store information about the connection state of the interface 120 in the storage. The second state may refer to the state in which the main processor 140 is inactivated and the sub-processor 130 is activated.

The main processor 140 may control overall operations of the display apparatus 100.

When the display apparatus 100 is in the first state, the main processor 140 may identify whether the source device 200 is turned on. The first state may refer to the state in which the main processor 140 and the sub-processor 130 are activated.

When the display apparatus 100 is in the second state, the sub-processor 130 may identify whether the source device 200 is turned on. The second state may refer to the state in which the main processor 140 is inactivated and the sub-processor 130 is activated. That is, even if the display apparatus 100 is in the second state, whether the source device 200 is turned on may be identified using the sub-processor 130 which operates with low power.

If the display apparatus 100 is changed from the second state to the first state, the main processor 140 may automatically identify the source device 200 based on the information stored in the storage (not shown in FIG. 2A).

For example, the sub-processor 130 may store information about the connection state of the interface 120 in the storage while the display apparatus 100 is in the second state, and the main processor 140 may automatically identify the source device 200 based on the information about the connection state of the interface 120. Particularly, the main processor 120 may perform an operation for automatically identifying the source device 200. The operation, according to an exemplary embodiment, will be described in detail later.

The main processor 140 may control the display 110 to display a UI according to whether the interface 120 is connected and whether the source device 200 is turned on.

Specifically, the main processor 140 may display one of a first UI indicating that the output terminal of the source device is not connected with the interface such as the interface 120, a second UI indicating that the output terminal of the source device is connected with the interface such as the interface 120 and the source device is turned off and a third UI indicating that the output terminal of the source device is connected with the interface such as the interface 120 and the source device is turned on.

When the display apparatus 100 is in the first state, the main processor 140 may identify whether the source device 200 is turned on based on a video signal and a clock signal which are input from the source device 200, and when the display apparatus 100 is in the second state, the sub-processor 130 may identify whether the source device 200 is turned on based on the clock signal.

For example, when the display apparatus 100 is in the first state, the main processor 140 may identify that the source device 200 is turned on in response to a video signal and a clock signal being input from the source device 200.

The main processor 140 may also receive a data signal and a clock signal from the source device 200, and identify whether the source device 200 is turned on based on at least one of an h-sync signal, a v-sync signal, and a clock signal.

For example, the processor 140 may receive a data signal and a clock signal from the source device 200, and identify that the source device 200 is turned on if there is no problem in one of the h-sync signal and the v-sync signal which are included in the data signal and in the clock signal.

Further, when the display apparatus 100 is in the second state, the sub-processor 130 may identify that the source device 200 is turned on if a clock signal is input from the source device 200, but is not limited to. The sub-processor 130 may also identify that the source device 200 is turned on in response to a video signal and a clock signal being input from the source device 200.

The display apparatus 100 may further include a storage (not shown), and the sub-processor 130 may store information about whether the interface 120 is connected to one or more source device 200 and whether the source device 200 is turned on in the second state in the storage. If the display apparatus 100 is changed from the second state to the first state, the main processor 140 may display a UI based on the information stored in the storage.

For example, when the display apparatus 100 is in the second state, the sub-processor 130 may identify whether the interface 120 is connected to the source device 200 and whether the source device 200 is turned on, and store the identification result in the storage. If the display apparatus 100 is changed from the second state to the first state, the main processor 140 may display a UI based on the information about whether the interface 120 is connected to the source device 200 and whether the source device 200 is turned on, which is stored in the storage.

The display apparatus 100 may further include a communicator (not illustrated). A remote control device may be an integrated remote controller which can control not only the display apparatus 100 but also the source device 200.

If the display apparatus 100 is changed from the second state to the first state while the source device 200 is turned off, the main processor 140 may transmit a control code set for controlling the source device 200 to the remote control device through the communicator. The control code set for controlling the source device 200 may be pre-stored in the storage.

If the display apparatus 100 is changed from the second state to the first state while the source device 200 is turned off, the main processor 140 may display a UI for controlling the source device 200. For example, the UI for controlling the source device 200 may include an icon which turns on the source device 200.

The interface 120 may be implemented as an input terminal including a plurality of pins, and the sub-processor 130 may identify whether the interface 120 is connected based on the voltage level of a first pin among the plurality of pins.

If the grounded second pin is shorted with the first pin and the first pin is grounded, the sub-processor 130 may identify that the output terminal of the source device 200 is connected with the interface 120, according to an exemplary embodiment.

Meanwhile, it has been described that the subject which identifies whether the source device 200 is turned on or off in the first state is different from the subject, which identifies whether the source device 200 is turned on or off in the second state, but is not limited thereto.

For example, the main processor 140 may identify whether the source device 200 which provides currently displayed content is turned on regardless of the state of the display apparatus 100, and the sub-processor 130 may identify whether the other source devices 200 is turned on.

The main processor 140 may also identify whether the source device 200 which is connected according to a HDMI standard is turned on regardless of the state of the display apparatus 100, and the sub-processor 130 may identify whether the other source device 200 is turned on.

The sub-processor 130 may periodically check whether the source device 200 is turned on. For example, the sub-processor 130 may check whether the second source device to the nth source device are turned on while the main processor 140 displays content received from the first source device. If the display apparatus 100 is turned off, the sub-processor 130 may check whether the source device 200, connected with the display apparatus 100, is turned on.

Meanwhile, while the main processor 140 displays content received from the first source device, the sub-processor 130 may check whether the second source device to the nth source device are turned on, and display the result of performing the checking in real time. For example, a user may input a command for displaying a UI indicating the state of the source device, and the display apparatus 100 may display a UI indicating the state of the source device on an area of a currently displayed content. The UI indicating the state of the source device may identify a change in the source device in real time and may change as the changes in the source device are detected. For example, if a user disconnects the second source device from the display apparatus, an icon indicating the second source device as being connected may be changed to an icon indicating that the second source device is not connected in the UI, which indicates the state of the source device.

Meanwhile, if the source device 200 is changed, the display apparatus 100 may provide information about the changed source device 200. For example, if the second source device is selected while content received from the first source device is displayed, the display apparatus 100 may display a UI indicating the state of the selected second source device. The display apparatus 100 may also display a UI indicating the state of not only the second source device but also of all the source devices which are connected with the display apparatus 100. Further, the display apparatus 100 may also provide information about the source device 200 according to a user command, in an exemplary embodiment.

Figure 2B:
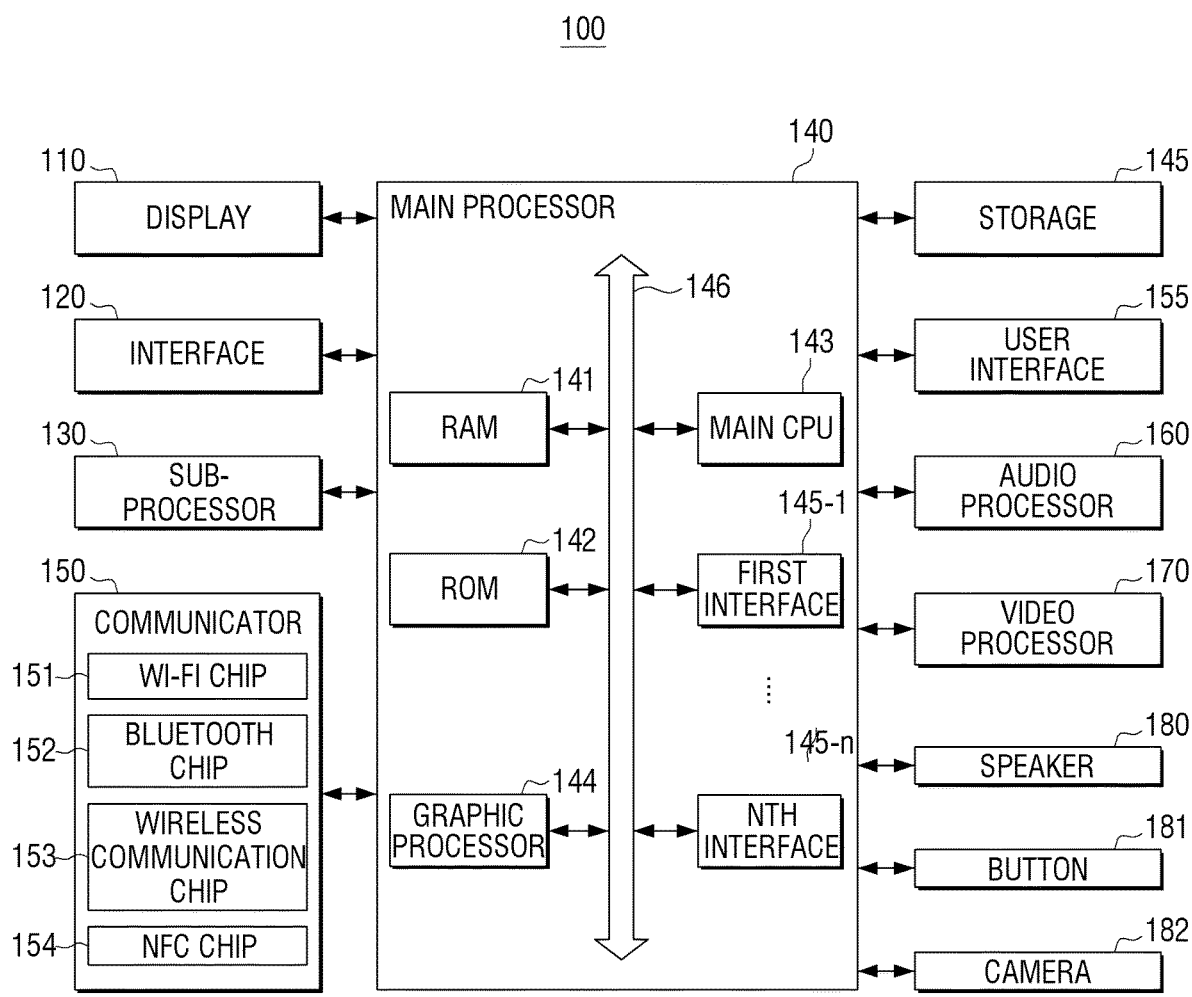
FIG. 2B is a block diagram illustrating a detailed configuration of a display apparatus according to an exemplary embodiment.

FIG. 2B is a block diagram illustrating a detail configuration of the display apparatus 100 according to an exemplary embodiment. According to FIG. 2B, the display apparatus 100 may include the display 110, the interface 120, the sub-processor 130, the main processor 140, a storage 145 such as a memory, a communicator 150, a user interface 155, an audio processor 160, a video processor 170, a speaker 180, a button 181 and a camera 182. The detailed description for the elements illustrated in FIG. 2B which are overlapped with the elements illustrated in FIG. 2A will not be repeated.

The processor 140 may control overall operations of the display apparatus 100 using various programs stored in the storage 145.

Specifically, the processor 140 may include a RAM 141, a ROM 142, a main CPU 143, a graphic processor 144, a first to nth interfaces 145-1 to 145-n and a bus 146.

The RAM 141, the ROM 142, the main CPU 143, the graphic processor 144 and the first to the nth interfaces 145-1~145-n may be connected with one another through the bus 146.

The first to the nth interfaces 145-1~145-n may be connected with various components described above. In FIG. 2B, besides the first to the nth interfaces 145-1~145-n connected with the internal components of the display apparatus 100, the interface 120 which is connected with a source device 200 may be provided outside of or external to the display apparatus 100.

The main CPU 143 may access to the storage 145 and perform booting using an operating system (O/S) stored in the storage 145, and also perform various operations using a diversity of programs, etc. stored in the storage 145.

In the ROM 142, a command words set for booting a system may be stored. Once a turn-on command is input and power is supplied, the main CPU 143 may copy an O/S stored in the storage 145 to the RAM 141 according to a command word stored in the ROM 142, and boot a system by executing the O/S. Once the booting is completed, the main CPU 143 may copy various application programs stored in the storage 145 to the RAM 141, and perform a variety of operations by executing the application programs copied to the RAM 141.

The graphic processor 144 may generate a screen including various objects such as an icon, an image, text, etc. using a computation component (not illustrated) and a renderer (not illustrated). The computation component (not illustrated) may calculate a property value such as a coordinate value, a form, a size, a color, etc. with which each object is displayed according to a layout of the screen based on a received control command. The renderer (not illustrated) may generate a screen with various layouts which includes an object based on the property value calculated by the computation component (not illustrated). The screen generated by the renderer (not illustrated) may be displayed on a display area of the display 110.

The operation of the processor 140 described above may be performed by a program stored in the storage 145.

The storage 145 may store various data such as an operating system (O/S) software module for driving the display apparatus 100, a module and/or software instructions identifying whether an interface is connected, a module and/or software instructions identifying whether a source device is turned on, identification result data, a control code set controlling the source device 200, or the like.

The processor 140 may process an input image based on the information stored in the storage 145 and display the processed image.

The communicator 150 may communicate with a variety of types of external devices according to various types of communication methods. The communicator 150 may include a Wi-Fi chip 151, a Bluetooth chip 152, a wireless communication chip 153, an NFC chip 154, etc. The processor 130 may communicate with various external devices using the communicator 150.

The Wi-Fi chip 151 and the Bluetooth chip 152 may communicate by a Wi-Fi method and a Bluetooth method, respectively. In the case of using the Wi-Fi chip 151 or the Bluetooth chip 152, various connection information such as an SSID, a session key, etc. may preliminarily be transmitted and received, communication connection is performed using the connection information, and receive various information. A wireless communication chip may refer to a chip which communicates according to various communication protocols such as an IEEE, a ZigBee, a 3rd generation (3G), a 3rd generation partnership (3GP), a long term evolution (LTE), and the like. An NFC chip may refer to a chip which operates in a near field communication (NFC) method using a 13.56 MHz-band from among various RF-ID frequency bands such as 135 kHz, 13.56 MHz, 433 MHz, 860 to 960 MHz, and 2.45 GHz.

The communicator 150 may perform unidirectional communication or bidirectional communication with an external device. In the case of performing the unidirectional communication, the communicator 150 may receive a signal from the external device. In the case of performing the bidirectional communication, the communicator 150 may receive a signal from the external device or transmit a signal to the external device.

The user interface 155 may receive various user interactions. The user interface 155 may be implemented in various forms according to an exemplary embodiment of the display apparatus 100. If the display apparatus 100 is implemented by a digital TV, the user interface 155 may be implemented as a receiver of a remote controller which receives a remote controller signal, a camera which identifies a user motion, a microphone which receives a user voice, etc. If the display apparatus 100 is implemented as a touch-based electronic apparatus, the user interface 155 may be implemented as a touch screen configured to form a mutual layer structure with a touch pad. In this case, the user interface 155 may be used as the display 120, described above, according to an exemplary embodiment.

The audio processor 160 may process audio data. The audio processor 160 may perform decoding and amplifying of audio data, noise filtering, etc.

The video processor 170 may process video data. The video processor 170 may perform various image-processes such as decoding, scaling, noise filtering, frame rate conversion, resolution conversion, etc. with respect to video data.

The speaker 180 may output not only various audio data processed by the audio processor 160 but also a variety of alarm sounds or a voice message, etc.

The button 181 may be various types of buttons such as a mechanical button, a touch pad, wheel, etc. which are formed on a voluntary area of the front, side, back, etc. of the exterior of a main body.

The camera 182 may photograph a still image or a video according to control of a user. The camera 182 may be implemented as a plurality of cameras such as a front camera and a rear camera.

As described above, according to an exemplary embodiment, the display apparatus 100 may display a UI based on whether the interface 120 is connected and based on whether the source device 200 is turned on, and provide the information about the state of the source device 200 to a user.

Hereinafter, the operations of the display apparatus 100 may be described more specifically with reference to the drawings, according to an exemplary embodiment.

Figure 3:
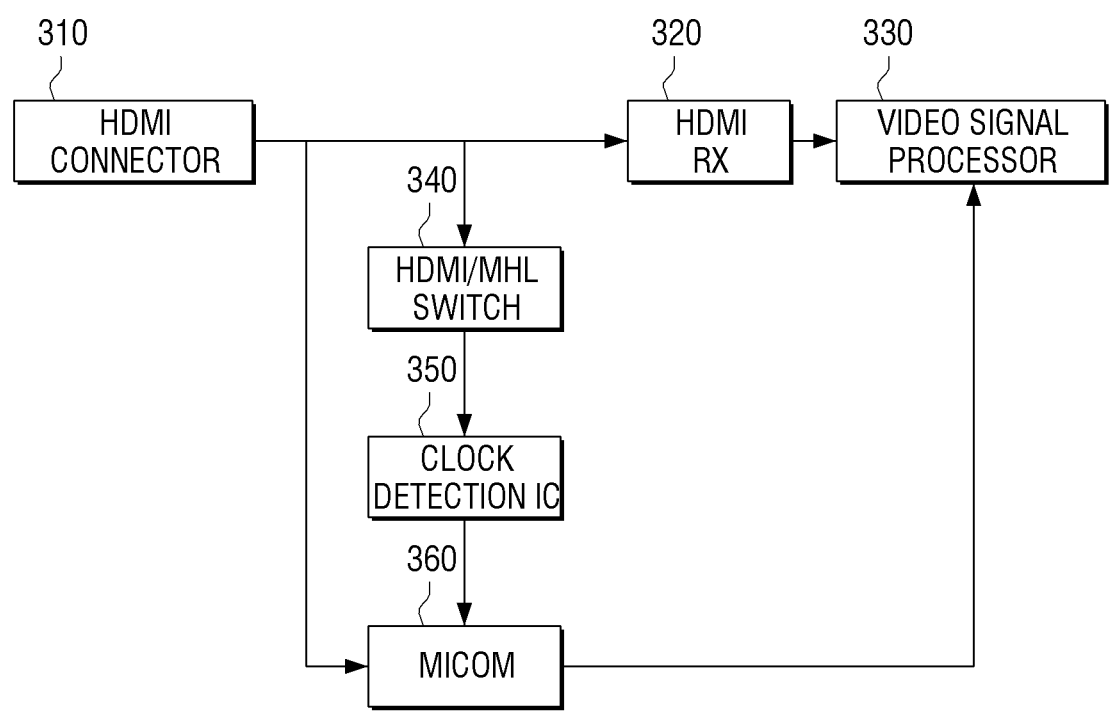
FIG. 3 is a block diagram illustrating a configuration of hardware according to an exemplary embodiment.

FIG. 3 is a block diagram illustrating a configuration of hardware according to an exemplary embodiment.

FIG. 3 illustrates an HDMI connector 310 as the interface 120, according to an exemplary embodiment. The HDMI connector 310 may be connected with an output terminal of the source device 200. FIG. 3 illustrates the HDMI connector 310 which communicates in accordance with an HDMI standard, but a connector which communicates in accordance with a different standard may also be used, according to an exemplary embodiment.

The HDMI RX 320 may receive a video signal and a clock signal which are input from the HDMI connector 310, and transmit the received signals to a video signal processor 330.

The video signal processor 330 may be a component of the main processor 140. When the display apparatus 100 is in the first state, the video signal processor 330 may identify whether the source device 200 is turned on. That is, the video signal processor 330 may identify whether the source device is turned on based on a video signal and a clock signal input from the source device 200 when the display apparatus 100 is in the first state.

For example, when the video signal and the clock signal are input from the source device 200, the video signal processor 330 may identify that the source device is turned on. If only the clock signal is input from the source device 200 (no video signal), the video signal processor 330 may identify that the source device is turned off.

Meanwhile, the first state of the display apparatus 100 may indicate that the video signal processor 330 and a clock detection integrated circuit (IC) 350 and a Micom 360, which will be described later, are activated. For example, if the display apparatus 100 is in the first state, it may be the state in which the power applied or supplied to the display apparatus 100 is also applied or supplied to the video signal processor 330, the clock detection IC 350, and the Micom 360, as in a normal mode. The first state may also be the state in which the display apparatus 100 is turned on.

An HDMI/MHL switch 340 may transmit a clock signal input through the HDMI connector 310 to the clock detection IC 350, which will be described later, based on the state of the display apparatus 100. For example, the HDMI/MHL switch 340 may not or does not transmit the clock signal to the clock detection IC 350 if the display apparatus 100 is turned on, but transmits the clock signal to the clock detection IC 350 if the display apparatus is turned off.

The clock detection IC 350 and the Micom 360 may be components of the sub-processor 130, according to an exemplary embodiment. When the display apparatus 100 is in the second state, the clock detection IC 350 and the Micom 360 may determine whether the source device is turned on. That is, when the display apparatus 100 is in the second state, the clock detection IC 350 and the Micom 360 may determine whether the source device is turned on based on the input clock signal.

For example, if the clock signal is input from the source device 200, the clock detection IC 350 and the Micom 360 may determine that the source device is turned on.

Meanwhile, the second state of the display apparatus 100 may indicate that the video signal processor 330 is inactivated and the clock detection IC 350 and the Micom 360 are activated. For example, if the display apparatus 100 is in the second state, it may be the state in which the power applied or supplied to the display apparatus 100 is not applied or supplied to the video signal processor 330 but is applied or supplied only to the clock detection IC 350 and the Micom 360, as in a standby mode. The second state may also be the state in which the display apparatus 100 is turned off.

Hereinafter, the operation of the clock detection IC 350 and the Micom 360 will be described in more detail according to an exemplary embodiment. First, the clock detection IC 350 may determine whether a clock signal is input, and provide an output signal that the Micom 360 can recognize.

For example, if a clock signal is input, the clock detection IC 350 may provide a low signal to the Micom 360, and if a clock signal is not input, the clock detection IC 350 may provide a high signal to the Micom 360.

The Micom 360 may determine whether a clock signal is input based on a signal output from the clock detection IC 350. For example, if the signal output from the clock detection IC 350 is a low signal, the Micom 360 may determine that a clock signal is input, and if the signal output from the clock detection IC 350 is a high signal, the Micom 360 may determine that a clock signal is not input.

The Micom 360 may determine whether an output terminal of the source device 200 is connected with the interface 120. The Micom 360 may determine whether the interface 120 is connected based on the voltage level of one of the plurality of pins included in the HDMI connector 310. The Micom 360 may determine whether an output terminal of the source device 200 is connected with the interface 120 regardless of the state of the display apparatus 100.

As described above, according to an exemplary embodiment, when the display apparatus 100 is turned on, the video signal processor 330 may identify whether the source device is turned on, and when the display apparatus 100 is turned off, the clock detection IC 350 and the Micom 360 may determine whether the source device is turned on. That is, when the display apparatus 100 is turned off, whether the source device is turned on may be identified using the clock detection IC 350 and the Micom 360 whose power consumption levels are relatively low.

However, whether the output terminal of the source device 200 is connected with the interface 120 may be determined by the Micom 360 regardless of the state of the display apparatus 100.

Meanwhile, in FIG. 3, it is illustrated that the clock detection IC 350 provides, to the Micom 360, an output signal based on whether a clock signal is input, but is not limited thereto. For example, the clock detection IC 350 may provide, to the video signal processor 330, an output signal based on whether a clock signal is input.

FIG. 3 illustrates only one HDMI connector 310, but the display apparatus 100 may include the interface 120 of various standards. If the display apparatus 100 is turned on, the main processor 140 may identify whether the source device 200 connected with the HDMI connector 310 is turned on, and the sub-processor 130 may identify whether the source device 200 connected with another interface 200 is turned on. In other words, according to an exemplary embodiment, as the display apparatus 100 is turned on, the clock signal received from the HDMI connector 310 may not be transmitted to the Micom 360, but the data received from the source device 200 which is connected with another interface 120 may be transmitted to the Micom 360.

Figure 4A:
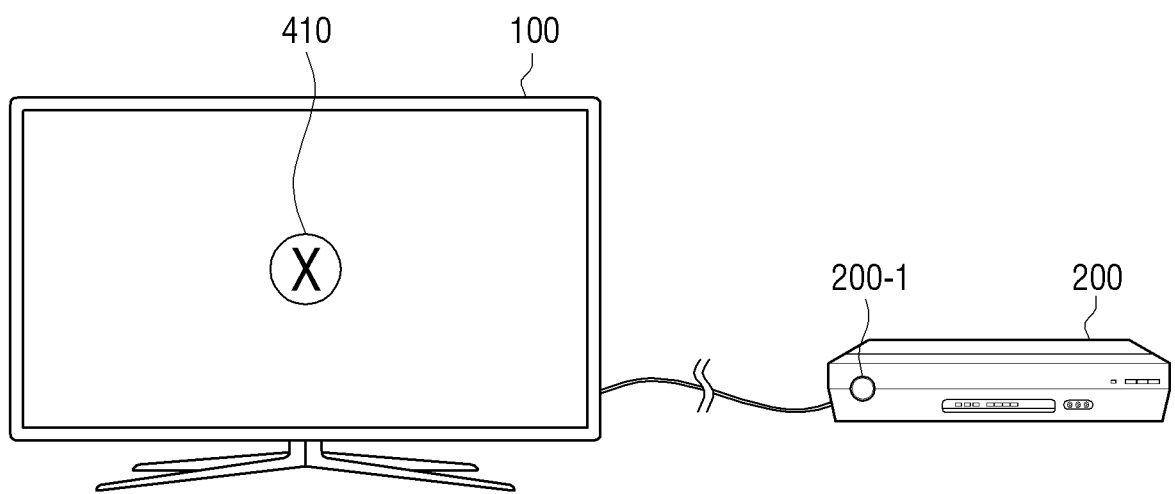
FIGS. 4A, 4B and 4C are views illustrating a user interface (UI) screens according to an exemplary embodiment.
Figure 4B:
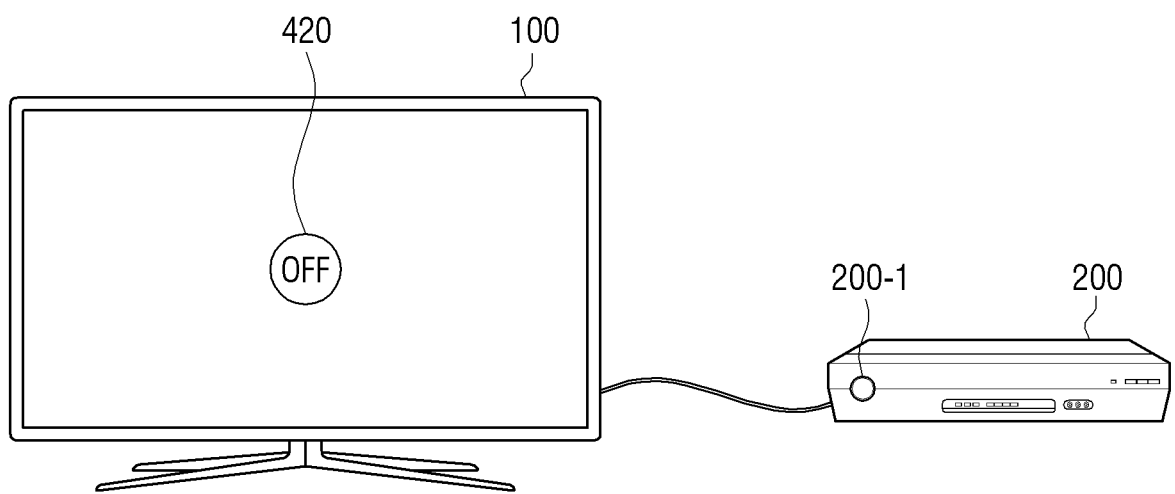
Figure 4C:
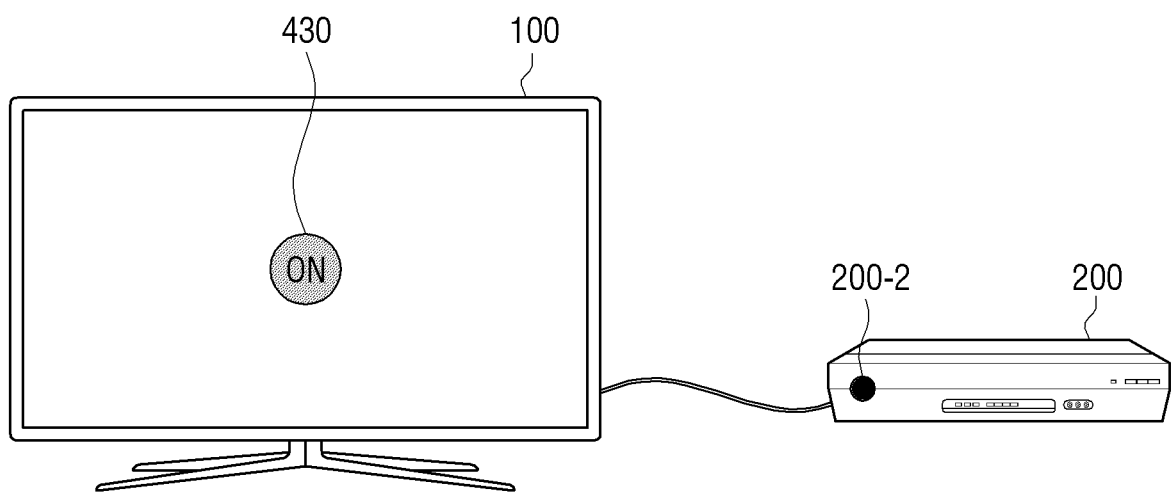

FIGS. 4A, 4B and 4C are views illustrating UI screens according to an exemplary embodiment.

As illustrated in FIGS. 4A, 4B and 4C, the main processor 140 may display a UI according to whether the interface is connected and according to whether the source device is turned on.

FIG. 4A is a view illustrating an icon 410 being displayed by the display apparatus 100. The icon 410 indicates that the output terminal of the source device 200 is not connected with the interface 120. Since the display apparatus 100 is not connected with the source device 200, it may be impossible to identify whether the source device 200 is turned on, and the information about whether the source device 200 is turned on may not be displayed. A light omitting diode (LED) 200-1 may be turned on when the source device 200 is turned on and turned off when the source device 200 is turned off. However, since the source device 200 is not connected with the display apparatus 100, the state of the source device 200 cannot be determined by the display apparatus 100.

Instead of the icon 410 or in addition to the icon 410, a phrase stating that the source device 200 is not connected may be displayed, according to an exemplary embodiment.

FIG. 4B is a view illustrating an icon 420 being displayed on the display apparatus 100. The icon 420 indicates that the output terminal of the source device 200 is connected with the interface 120 and that the source device 200 is turned off. According to an exemplary embodiment, the LED 200-1 provided in the source device 200 may also be turned off and indicate that the source device 200 is turned off.

Instead of the icon 420 or in addition to the icon 420, a phrase stating that the source device 200 is connected but is turned off may be displayed, according to an exemplary embodiment.

FIG. 4C is a view illustrating an icon 430 being displayed by the display apparatus 100. The icon 430 indicates that the output terminal of the source device 200 is connected with the interface 120 and that the source device 200 is turned on is displayed. According to an exemplary embodiment, the LED 200-1 provided in the source device 200 may also be turned on and indicate that the source device 200 is turned on.

Instead of the icon 430 or in addition to the icon 430, a phrase stating that the source device 200 is connected and is turned on may be displayed, according to an exemplary embodiment.

FIGS. 4A, 4B and 4C are views illustrating UIs displayed based on whether the interface 120 is connected with one source device 200 and based on whether the source device 200 is turned on, according to exemplary embodiments, but are not limited thereto.

For example, the display apparatus 100 may display the UI based on whether the interface 120 is connected with the first source device and the second source device and whether each of the source devices is turned on. According to an exemplary embodiment, a plurality of icons indicating each of the first source device and the second source device may be displayed, and identification information about the corresponding source device may also be displayed on a lower part of each icon, by way of an example and not by way of a limitation.

Meanwhile, the form and the display position of an icon may be changed, according to an exemplary embodiment. For example, as in FIG. 4C, when the source device 200 is turned on and content is provided from the source device 200, the display apparatus 100 may display the content. The display apparatus 100 may display an icon on an outer area or peripheral area of the display and not on the central area, to minimize the interruption in viewing content.

Figure 5:
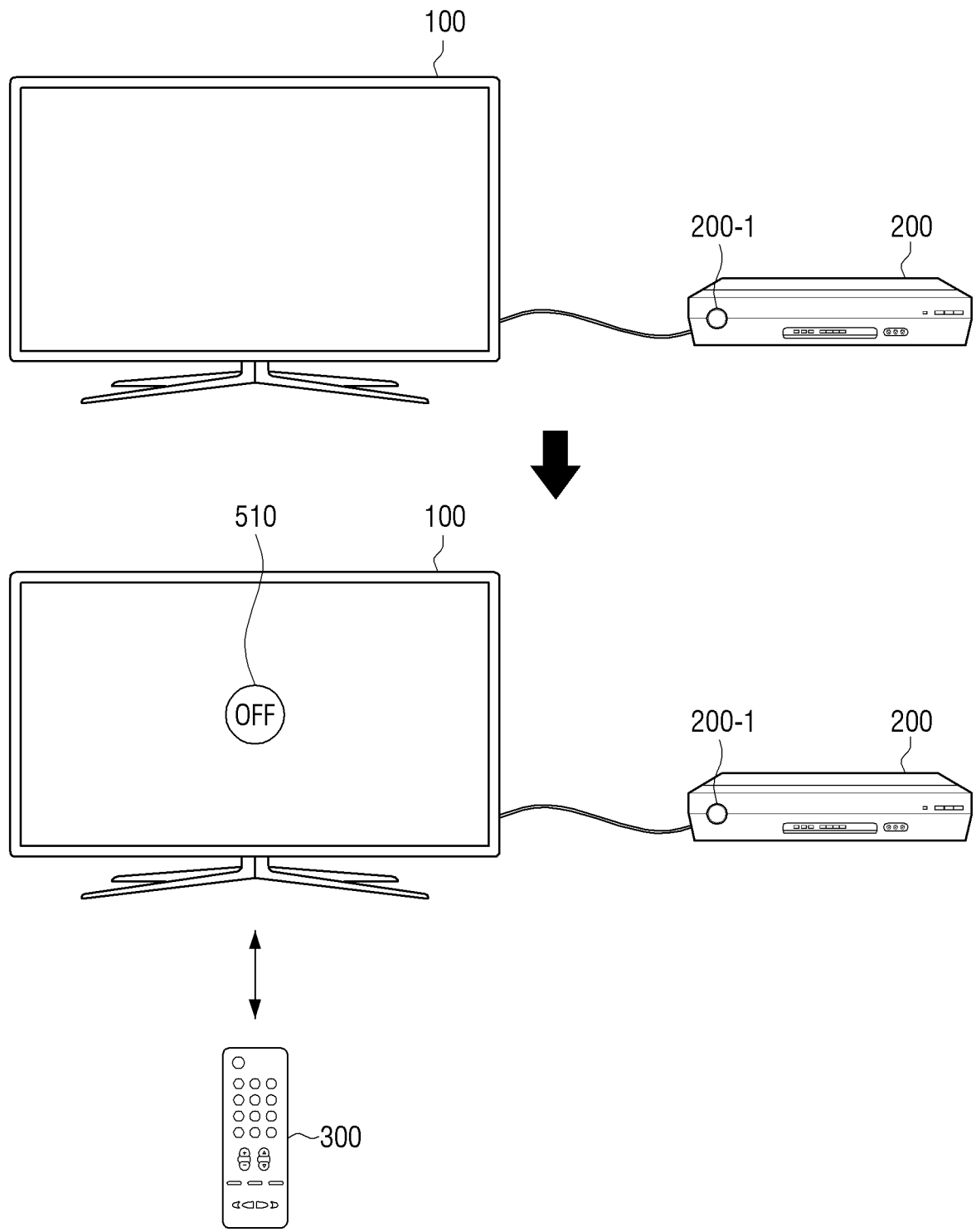
FIG. 5 is a flow diagram illustrating an operation according to a change in the state of a display apparatus according to an exemplary embodiment.

FIG. 5 is a flow diagram illustrating an operation according to a change in the state of the display apparatus 100 according to an exemplary embodiment.

As illustrated in the upper portion of FIG. 5, the sub-processor 130 may identify whether the source device 200 is connected with the interface 120 in the second state and whether the source device 200 is turned on, and store the identified information in the storage 145.

Then, as illustrated in the lower portion of FIG. 5, according to an exemplary embodiment, if the display apparatus is changed from the second state to the first state, the main processor 140 may display a UI based on the information about whether the source device 200 is connected and whether the source device 200 is turned on, which is stored in the storage 145.

For example, when the display apparatus 100 is in the second state, the sub-processor 130 may store the information about whether the interface 120 is connected to the source device 200 and whether the source device 200 is turned on, in the storage 145. If the display apparatus 100 is changed to the first state, the main processor 140 may display a UI 510, which includes the information about whether the interface 120 is connected to the source device 200 and whether the source device 200 is turned on, which is stored in the storage 145.

If the display apparatus 100 is changed from the second state to the first state while the source device 200 is turned off, the main processor 140 may also transmit a control code set for controlling the source device 200 to the remote control device 300.

For example, if the display apparatus 100 enters the first state while the source device 200 is turned off, the main processor 140 may transmit a control code set for controlling the source device 200 to the remote control device 300.

The control code set may be the information stored in the storage 145. The remote control device 300 may be an integrated remote controller which can control not only the display apparatus 100 and the source device 200 but also various other electronic devices. If the control code set is received, the remote control device 300 may map a button based on the received control code set and control the source device 200. The main processor 140 may transmit the control code set to the remote control device 300 through the communicator 150 provided in the display apparatus 100.

However, it is not limited to the above exemplary embodiment. The main processor 140 may display a UI for asking a user whether to transmit a control code set before transmitting the control code set to the remote control device 300.

If the display apparatus 100 enters the first state while the source device 200 is turned off, the main processor 140 may transmit a control code set to the remote control device 300 only if the source device 200 is identified. If the source device 200 is not identified, the main processor 140 may transmit, to the source device 200, a first signal for temporarily turning on the source device 200 and a second signal for requesting identification information of the source device 200. When the identification information of the source device is received, the main processor 140 may transmit a control code set for controlling the source device 200 to the remote control device 300, and transmit a third signal, to the source device 200, for turning off the source device 200.

If the display apparatus 100 is changed from the second state to the first state while the output terminal of the source device 200 is not connected with the interface 120, the main processor 140 may display a UI indicating that the connection state between the interface 120 and the source device 200 needs to be checked i.e., that the source device 200 is not connected to the display apparatus 100.

Particularly, the main processor 140 may store information about the connection state of the interface 120 to the source device 200 in the storage 145 before the display apparatus 100 enters the second state. When the display apparatus 100 enters the second state, the sub-processor may store the information about whether the connection state of the interface 120 to the source device 200 has been changed.

For example, the main processor 140 may store the information that the output terminal of the source device 200 is connected with the interface 120 right before the display apparatus 100 is changed from the first state to the second state i.e., prior to entering the second state, and when the output terminal of the source device 200 is disconnected from the interface 120 after the display apparatus 100 enters the second state, the sub-processor 130 may store the corresponding information in the storage 145. If the display apparatus 100 is then changed back to the first state, the main processor 140 may display a UI indicating that the connection state between the interface 120 and the source device 200 needs to be checked i.e., that the source device 200 has been disconnected, based on the information stored in the storage 145.

If the interface 120 is not connected with the source device 200 right before the display apparatus 100 is changed from the first state to the second state, the main processor 140 may not display a UI indicating that the connection state between the interface 120 and the source device 200 needs to be checked even if the display apparatus 100 is changed back to the first state from the second state. That is, if the display apparatus 100 is in the second state, the sub-processor 130 may store the information about the change in the connection state of the interface 120 with the source device 200.

However, it is not limited to the above exemplary embodiments. If the display apparatus 100 is in the second state, the sub-processor 130 may also store the information about the connection state of the interface 120 with the source device 200. In this case, the main processor 140 may compare the stored information about the connection state of the interface 120 with the information right before the display apparatus 100 enters the second state, and identify whether to display a UI informing that the connection state between the interface 120 and the source device 200 needs to be checked.

For example, the source device 200 is connected with the interface 120 before the display apparatus 100 enters the second state, but if the source device 200 is disconnected from the interface 120 after the display apparatus 100 enters the second state, the sub-processor 130 may store the state information that there is no source device 200 connected with the interface 120. If the display apparatus 100 returns to the first state, the main processor 140 may identify that the connection state of the interface 120 has been changed while the display apparatus 100 is in the first state based on the information that the source device 200 was connected with the interface 120 before the display apparatus 100 entered the second state, and the main processor 140 may display a UI indicating that the connection state between the interface 120 and the source device 200 needs to be checked. In other words, the main processor 140 may compare the information about the connection state of the interface 120 right before the display apparatus 100 enters the second state with the information about the connection state of the interface 120 when the display apparatus is in the second state, and identify whether to display a UI indicating that the connection state between the interface 120 and the source device 200 needs to be checked.

Figure 6:
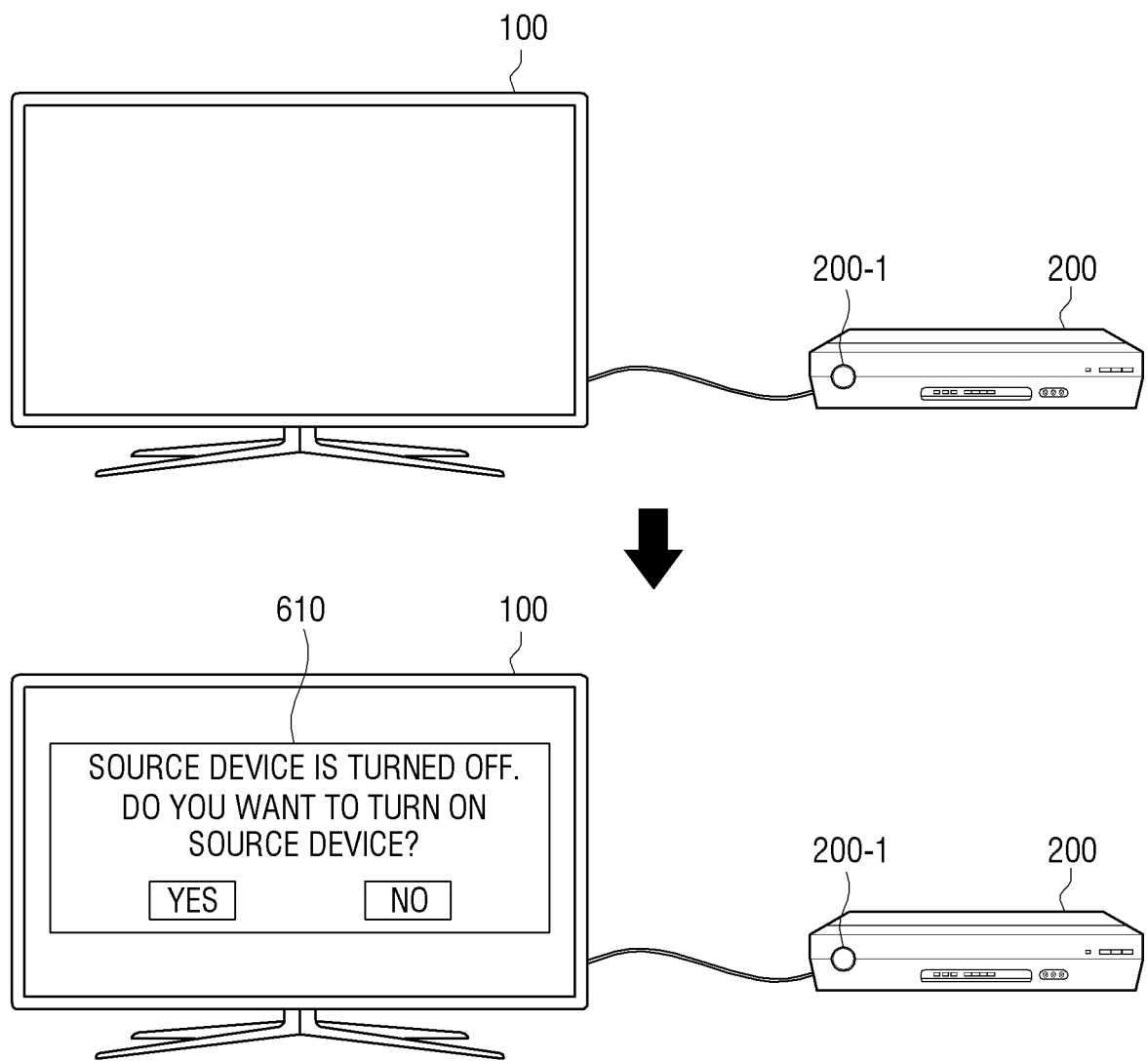
FIG. 6 is a flow diagram illustrating an operation according to a change in the state of a display apparatus according to another exemplary embodiment.

FIG. 6 is a flow diagram illustrating an operation according to a change in the state of the display apparatus 100 according to an exemplary embodiment.

As illustrated in FIG. 6, if the display apparatus 100 is changed from the second state to the first state while the source device 200 is turned off, the main processor 140 may display a UI for controlling the source device 200, according to an exemplary embodiment.

For example, when the display apparatus 100 is in the second state, the sub-processor 130 may store the information about whether the source device 200 is turned on in the storage 145. If the display apparatus 100 enters the first state, the main processor 140 may obtain the information about whether the source device 200 is turned on based on the information stored in the storage 145. If the source device 200 is turned off, the main processor 140 may display a UI 610 for turning on the source device 200.

However, it is not limited to the above example. The main processor 140 may display not only the UI for controlling the source device 200 but also the information indicating the operation state of the source device 200, such as an icon illustrated in FIG. 4B. The main processor 140 may also transmit a control code set for controlling the source device 200 to the remote control device 300, or transmit a signal, directly to the source device 200, for turning on the source device 200.

Figure 7A:
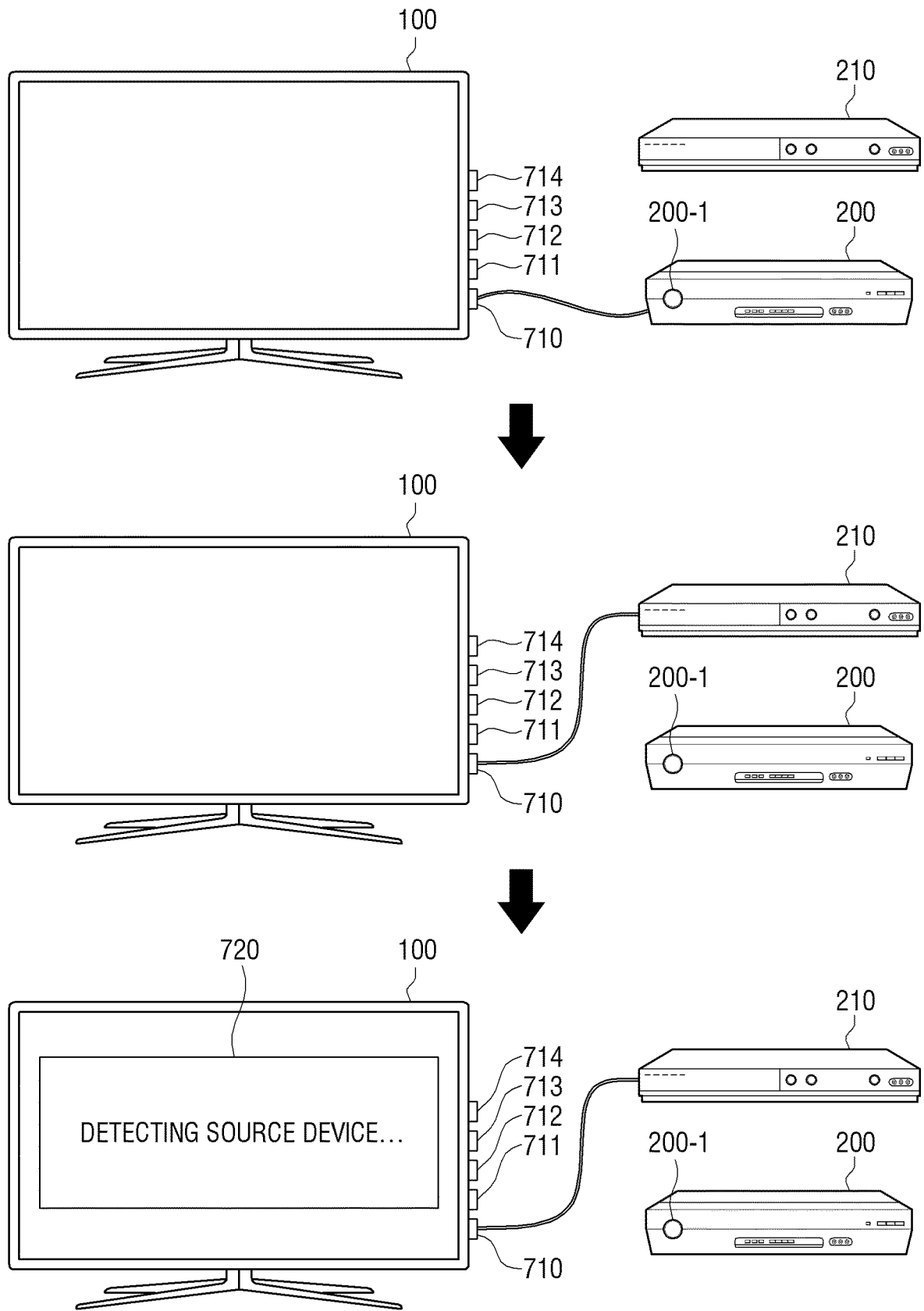

FIGS. 7A and 7B are flow diagrams illustrating an automatic identification performed by a display apparatus according to an exemplary embodiment.

The upper part in FIG. 7A illustrates that the display apparatus 100 is in the second state and that the display apparatus 100 is connected with the first source device 200. The display apparatus 100 may include the interface 120 for connecting to the source device, and the interface 120 may include a plurality of ports 710, 711, 712, 713 and 714. The display apparatus 100 may be connected with the first source device 200 through the first port 710. The display apparatus 100 may detect the connection state of each port.

The center part in FIG. 7A illustrates that the display apparatus 100 continues to be in the second state and that the display apparatus 100 is disconnected from the first source device 200 and is now connected with the second source device 210. If the output terminal of the source device 200 is removed from the first port 710, the sub-processor 130 of the display apparatus 100 may identify that the display apparatus 100 is disconnected from the first source device 200. Then, the sub-processor 130 may identify that the output terminal of the second source device 210 is connected with the first port 710. The sub-processor 130 may store the information that the display apparatus 100 is disconnected and reconnected from the first port 710 in the storage 145.

The lower part in FIG. 7A illustrates that the display apparatus 100 is changed to the first state, according to an exemplary embodiment. If the display apparatus 100 enters the first state, the main processor 140 may check the information stored in the storage 145 by the sub-processor 130 while the display apparatus 100 was in the second state.

The main processor 140 may automatically identify the second source device 210 currently connected with the first port 710 based on the information that the first port 710 is disconnected but is connected back. That is, the main processor 140 may check whether the device connected with the first port 710 is changed while the display apparatus 100 is in the second state. The main processor 140 may display a guide message such as "identifying source device . . . " while identifying the second source device 210.

For example, the main processor 140 may transmit a signal requesting device identification information to the second source device 210. The device identification information may include a serial number, a model name, a model number, and a manufacturing company, etc. When the device identification information is received from the second source device 210, the main processor 140 may identify the second source device 210 based on the received information, and perform an operation for controlling the identified second source device 210. For example, the main processor 140 may transmit a control code set corresponding to the identified second source device 210 to a remote control device. The main processor 140 may also display information about the identified second source device 210.

If the device identification information is not received from the second source device 210, the main processor 140 may display a guide message indicating that the second source device is not identified. According to an exemplary embodiment, the main processor 140 may identify the second source device according to a user input. The main processor 140 may also display a guide message requesting user input with respect to the second source device 210.

FIG. 7B is a flow diagram illustrating various possibilities of source device connections based on the state of the display apparatus 100, according to an exemplary embodiment. It is assumed that the display apparatus 100 is changed from the first state to the second state and is then changed back to the first state.

Case 1 shows that the display apparatus 100 is in the first state and the source device 200 is connected but the source device 200 is disconnected after the display apparatus 100 is changed to the second state. If the display apparatus 100 returns to the first state at a later point in time, the main processor 140 may display a UI indicating that the connection state needs to be checked i.e., that the source device 200 is disconnected from the display apparatus 100. That is, the main processor 140 may inform a user that the source device 200 was connected but has now been disconnected.

Case 2 shows that the display apparatus 100 is in the first state and the source device 200 is connected and the connection with the source device 200 is maintained after the display apparatus 100 is changed to the second state. If the display apparatus 100 returns to the first state at a later point in time, the main processor 140 may display a general UI. For example, the main processor may display a UI illustrated in FIG. 4B or FIG. 4C.

Case 3 shows that the display apparatus 100 is in the first state and the source device 200 is connected but the source device 200 is disconnected after the display apparatus 100 is changed to the second and is connected back while the display apparatus 100 is in the second state. If the display apparatus 100 returns to the first state at a later point in time, the main processor 140 may automatically identify the source device 200. That is, the main processor 140 may identify whether the currently connected source device 200 has been changed.

Case 4 shows that the display apparatus 100 is in the first state and the source device 200 is not connected but the source device has still not been connected after the display apparatus 100 is changed to the second state. If the display apparatus 100 returns to the first state at a later point in time, the main processor 140 may not perform any operation. That is, the main processor 140 may not display any UI regarding the source device 200. However, it is not limited to the above example. The main processor 140 may also display a UI indicating that the source device 200 is not connected.

Case 5 shows that the display apparatus 100 is in the first state and the source device 200 is not connected but the source device 200 is connected after the display apparatus 100 is changed to the second state. If the display apparatus 100 returns to the first state at a later point in time, the main processor 140 may automatically identify the source device 200. That is, the main processor 140 may identify the currently connected source device 200.

Case 6 shows that the display apparatus 100 is in the first state and the source device 200 is not connected but the source device 200 is connected after the display apparatus 100 is changed to the second state and is disconnected again while the display apparatus 100 is in the second state. If the display apparatus 100 returns to the first state at a later point in time, the main processor 140 may display a UI indicating that the connection state needs to be checked i.e., that the source device 200 is disconnected. That is, the main processor 140 may inform a user that the source device 200 has been disconnected.

However, it is not limited to the above exemplary embodiment. The main processor 140 may not perform any operation i.e., may not display any UI regarding the source device 200, based on the information that the source device 200 was not connected in the first state.

As described above, according to an exemplary embodiment, even when the main processor 140 is inactivated, the display apparatus 100 may identify whether the display apparatus 100 is connected with the source device 200, whether a connection state is changed or whether a change in the connection state occurred, whether a source device is turned on, etc. using the sub-processor 130 operating with a low power.

Figure 8A:
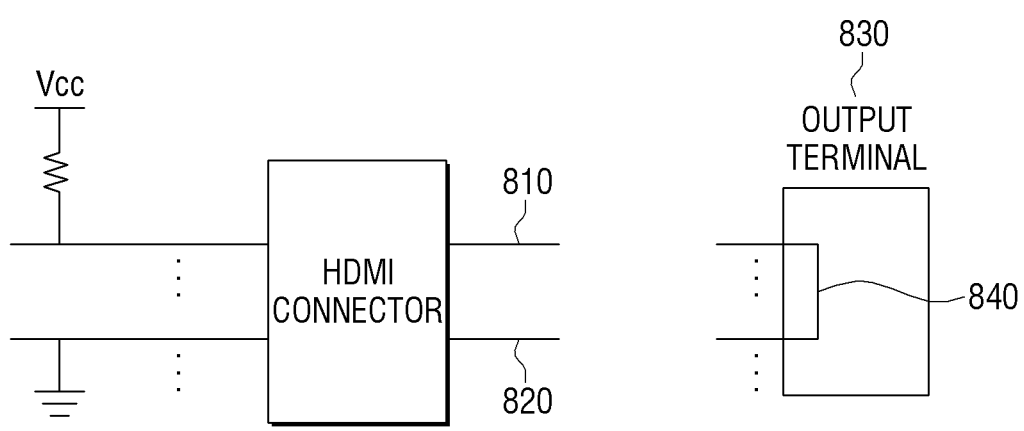
FIGS. 8A and 8B are diagrams illustrating an identification of whether an interface is connected to a source device according to an exemplary embodiment.
Figure 8B:
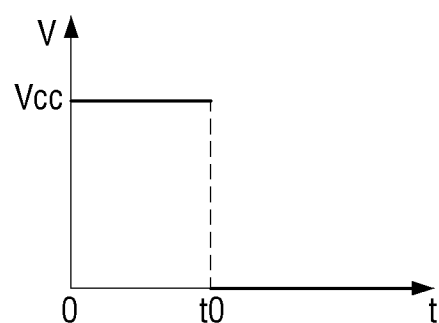

FIGS. 8A and 8B are diagrams illustrating an identification of whether the interface 120 is connected to the source device according to an exemplary embodiment.

As illustrated in FIG. 8A, the interface 120 may be implemented as an input terminal including a plurality of pins. The sub-processor 130 may identify whether the interface 120 is connected based on the voltage level of a first pin 810 among the plurality of pins. The first pin 810 may be in the state in which Vcc voltage is applied or supplied.

If a grounded second pin 820 is shorted with the first pin 810 and the first pin 810 is grounded, the sub-processor 130 may identify that an output terminal of the source device 200 is connected with the interface 120.

The first pin 810 and the second pin 820 may be shorted by an output terminal 830 of the source device 200. For example, a connected part 840 of the output terminal 830 of the source device 200, which is to be connected with the first pin 810 and the second pin 820, may be shorted internally. Accordingly, if the output terminal 830 of the source device 200 is connected to the interface, the first pin 810 may be connected with the second pin 820, and also the first pin 810 may be grounded by the grounded second pin 820.

As illustrated in FIG. 8B, the sub-processor 130 may identify the voltage level of the first pin 810. The sub-processor 130 may identify that the output terminal of the source device 200 is connected with the interface 120 at the time point t0 when the voltage of the first pin 810 is changed from Vcc[V] to 0[V].

Meanwhile, in FIG. 8A, the configuration of a circuit is illustrated briefly for clarity, according to an exemplary embodiment. The actual structure of the interface 120 may be different.

Further, in FIGS. 8A and 8B, it is assumed that the interface 120 communicates in accordance with an HDMI standard, but the same method may be applied to an interface which communicates according to a different standard.

Figure 9:
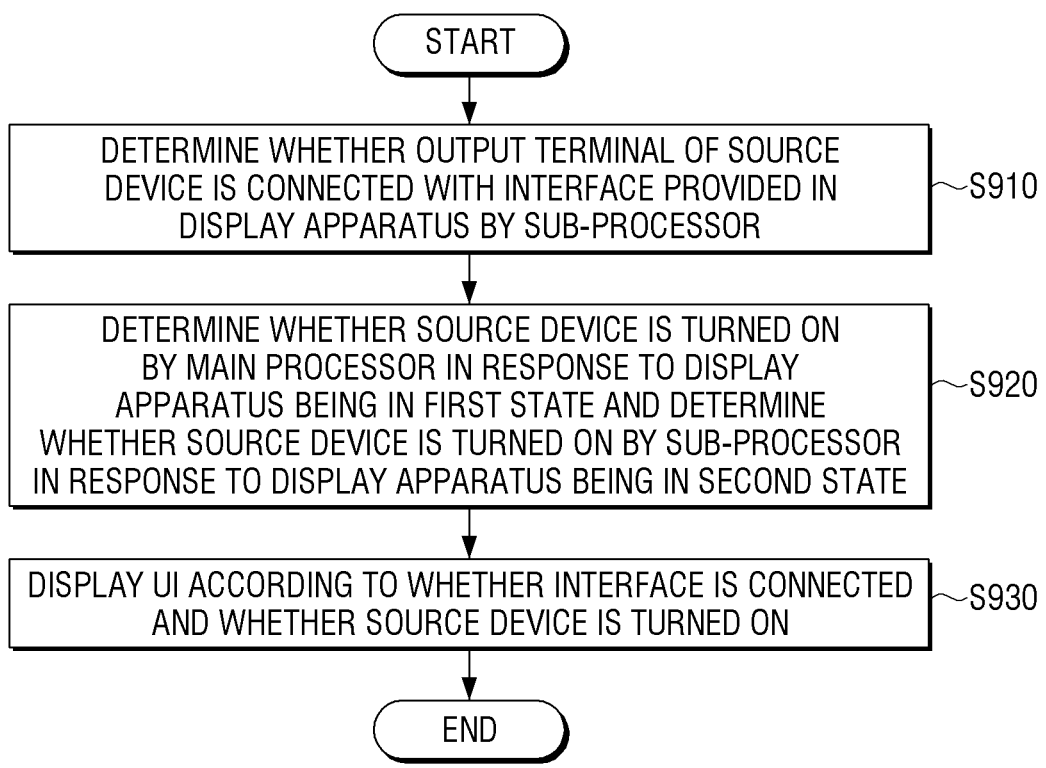
FIG. 9 is a flowchart illustrating a method of controlling a display apparatus according to an exemplary embodiment.

FIG. 9 is a flowchart illustrating a method of controlling a display apparatus according to an exemplary embodiment.

According to the method of controlling a display apparatus including a main processor and a sub-processor, whether an output terminal of a source device is connected with an interface provided in a display apparatus may be identified by the sub-processor (in operation S910). If the display apparatus is in the first state, whether the source device is turned on may be identified by the main processor, and if the display apparatus is in the second state, whether the source device is turned on may be identified by the sub-processor (in operation S920). Then, a UI is displayed according to whether the interface is connected and according to whether the source device is turned on (in operation S930).

The method may further include an operation of storing information about the connection state of the interface if the connection state of the interface is changed while the display apparatus is in the second state and the operation of automatically identifying a source device based on the information about the connection state of the interface if the display apparatus is changed from the second state to the first state, according to an exemplary embodiment.

In the operation of displaying a UI (S930), one UI is displayed selected from among a first UI which indicates that the output terminal of the source device is not connected with the interface, a second UI which indicates that the output terminal of the source device is connected with the interface and the source device is turned off, and a third UI which indicates that the output terminal of the source device is connected with the interface and the source device is turned on.

In the operation of identifying whether the source device is turned on (S920), if the display apparatus is in the first state, whether the source device is turned on may be identified by the main processor based on a video signal and a clock signal which are input from the source device, and if the display apparatus is in the second state, whether the source device is turned on may be identified by the sub-processor based on the clock signal.

The control method may further include the operation of storing information about whether the interface is connected and about whether the source device is turned on in the second state, and in the operation of displaying a UI (S930), if the display apparatus is changed from the second state to the first state, a UI may be displayed based on the information stored in a storage.

If the display apparatus is changed from the second state to the first state while the source device is turned off, the control method may further include the operation of transmitting a control code set for controlling the source device to a remote control device.

Also, if the display apparatus is changed from the second state to the first state while the source device is turned off, the control method may further include the operation of displaying a UI for controlling the source device.

Meanwhile, the interface may be implemented as an input terminal including a plurality of pins, and in the operation of identifying whether the interface is connected (S910), when a grounded second pin among the plurality of pins is shorted with a first pin and the first pin is grounded, it may be identified that the output terminal of the source device is connected with the interface.

Meanwhile, the first state may be a state in which the main processor and the sub-processor are activated, and the second state may be a state in which the main processor is inactivated and the sub-processor is activated.

Further, the interface may communicate in accordance with a high definition multimedia interface (HDMI) standard.

According to the various exemplary embodiments described above, the display apparatus may provide information about the connection state of the source device by displaying the information about whether the display apparatus is connected with the source device and about whether the source device is turned on, thereby improving user convenience.

Methods according to various exemplary embodiments above may be programmed and stored in various storage mediums. Accordingly, methods according to various exemplary embodiments described above may be implemented in various types of electronic apparatuses which execute a storage medium.

Specifically, a non-transitory computer readable medium in which a program sequentially performing the above-described controlling methods may be provided.

A non-transitory computer readable medium may refer to a machine-readable medium or device that stores data semi-permanently and not for a short period of time, such as a register, cache, memory, and the like. The aforementioned various applications or programs may be stored in a non-transitory computer readable medium such as a compact disc (CD), a digital versatile disc (DVD), a hard disk, a Blu-ray disc, a Universal Serial Bus (USB) stick, a memory card, a ROM, etc.

The foregoing exemplary embodiments and advantages are merely examples and are not to be construed as limiting. The description of exemplary embodiments is intended to be illustrative, and not to limit the scope and spirit of the present disclosure, as defined by the appended claims and their equivalents. Many alternatives, modifications, and variations will be apparent to those skilled in the art. Therefore, the scope of the present disclosure is defined not by the detailed description of exemplary embodiments but by the appended claims and their equivalents, and all differences within the scope will be construed as being included in the present disclosure.

What is claimed is:

1. A display apparatus comprising:
a display;
an interface configured to connect to an output terminal of a source device;
a main processor configured to control an operation of the display apparatus; and
a sub-processor configured to identify whether the output terminal of the source device is connected with the interface;
wherein, based on the display apparatus being in a first state, the main processor without using the sub-processor identifies whether the source device is turned on,
wherein, based on the display apparatus being in a second state in which the main processor is inactive, the sub-processor without using the main processor identifies whether the source device is turned on, and
wherein the main processor controls the display to display a user interface (UI) based on at least one of whether the interface is connected to the output terminal of the source device and whether the source device is turned on,
wherein the first state is a state in which the display apparatus operates in a normal mode, and the main processor and the sub-processor are activated,
wherein the second state is a state in which the display apparatus operates in a standby mode, the main processor is inactivated and the sub-processor is activated.

2. The display apparatus of claim 1, further comprising:
a memory,
wherein, in response to a change in a connection state of the interface to the output terminal of the source device while the display apparatus is in the second state, the sub-processor stores, in the memory, information about the connection state of the interface to the output terminal of the source device, and
wherein, based on the display apparatus being changed back from the second state to the first state, the main processor is further configured to automatically identify the source device based on the information, stored in the memory, about the connection state of the interface to the output terminal of the source device.

3. The display apparatus of claim 1, wherein the main processor controls the display to display one UI selected from among a first UI which indicates that the output terminal of the source device is not connected with the interface, a second UI which indicates that the output terminal of the source device is connected with the interface and the source device is turned off, and a third UI which indicates that the output terminal of the source device is connected with the interface and the source device is turned on.

4. The display apparatus of claim 1, wherein, based on the display apparatus being in the first state, the main processor is further configured to identify whether the source device is turned on based on a video signal and a clock signal which are input into the interface from the source device, and
wherein, based on the display apparatus being in the second state, the sub-processor is further configured to identify whether the source device is turned on based on the clock signal.

5. The display apparatus of claim 1, further comprising:
a memory,
wherein, based on the display apparatus being in the second state, the sub-processor is further configured to store, in the memory, information about whether the interface is connected to the output terminal of the source device and about whether the source device is turned on, and
wherein, based on the display apparatus being changed back from the second state to the first state, the main processor is further configured to control the display to display the UI based on the information stored in the memory.

6. The display apparatus of claim 5, further comprising:
a communicator,
wherein, based on the display apparatus being changed back from the second state to the first state while the source device is turned off, the main processor is further configured to control the communicator to transmit to a remote control device a control code set controlling the source device which is stored in the memory.

7. The display apparatus of claim 1, wherein, based on the display apparatus being changed back from the second state to the first state, the main processor is further configured to control the display to display another UI providing information to control the source device.

8. The display apparatus of claim 1, wherein the interface is an input terminal comprising a plurality of pins, and
wherein, based on a grounded second pin from among the plurality of pins being shorted with a first pin from among the plurality of pins and the first pin being grounded, the sub-processor is further configured to identify that the output terminal of the source device is connected with the interface.

9. The display apparatus of claim 1 wherein the sub-processor determines whether another output terminal of another source device is connected to another interface of the display apparatus in the first state.

10. The display apparatus of claim 1, wherein the interface is further configured to communicate based on a high definition multimedia interface (HDMI) standard.

11. The display apparatus of claim 1, wherein the sub-processor is configured to operate with lower power than power used by the main processor and is a micro-computer which is further configured to perform some of functions of the display apparatus with the low power.

12. The display apparatus of claim 1, wherein the main processor receives a data signal and a clock signal from a source device and identifies whether the source device is turned on based on at least one of an h-sync signal and a v-sync signal included in one of a data signal and the clock signal.

13. The display apparatus of claim 1, further comprising:
an HDMI/MHL switch configured to transmit a clock signal input through the interface to one of a clock detection integrated circuit based on the display apparatus being in the second state and the main processor based on the display apparatus being in the first state.

14. A method of controlling a display apparatus comprising a main processor and a sub-processor, the method comprising:
identifying, by the sub-processor, whether an output terminal of a source device is connected with an interface of the display apparatus;
identifying, by the main processor without using the sub-processor, whether the source device is turned on based on the display apparatus being in a first state;
identifying, by the sub-processor without using the main processor, whether the source device is turned on based on the display apparatus being in a second state in which the main processor is inactive; and
displaying a user interface (UI) based on at least one of whether the interface is connected with the output terminal of the source device and whether the source device is turned on,
wherein the first state is a state in which the display apparatus operates in a normal mode, and the main processor and the sub-processor are activated,
wherein the second state is a state in which the display apparatus operates in a standby mode, the main processor is inactivated and the sub-processor is activated.

15. The method of claim 14, further comprising:
in response to a change in a connection state of the interface with respect to the output terminal while the display apparatus is in the second state, storing, in a memory, information about the connection state of the interface; and
based on the display apparatus being changed back from the second state to the first state, automatically identifying the source device based on the information about the connection state of the interface.

16. The method of claim 14, wherein the displaying the UI comprises displaying one UI selected from among a first UI which indicates that the output terminal of the source device is not connected with the interface, a second UI which indicates that the output terminal of the source device is connected with the interface and the source device is turned off, and a third UI which indicates that the output terminal of the source device is connected with the interface and the source device is turned on.

17. The method of claim 14, wherein the identifying whether the source device is turned on comprises:
based on the display apparatus being in the first state, identifying, by the main processor, whether the source device is turned on based on a video signal and a clock signal which are input into the interface from the source device, and
based on the display apparatus being in the second state, identifying, by the sub-processor, whether the source device is turned on based on the clock signal.

18. The method of claim 14, further comprising:
based on the display apparatus being in the second state, storing, in a memory, information about whether the interface is connected to the output terminal of the source device and whether the source device is turned on,
wherein the displaying the UI further comprises based on the display apparatus being changed back from the second state to the first state, displaying the UI based on the information stored in the memory.

19. The method of claim 18, further comprising: based on the display apparatus being changed back from the second state to the first state while the source device is turned off, transmitting, to a remote control device, a control code set controlling the source device.

20. The method of claim 14, further comprising:
based on the display apparatus being changed back from the second state to the first state, displaying another UI providing information to control the source device.

21. The method of claim 14, wherein the interface is an input terminal comprising a plurality of pins, and wherein the identifying whether the interface is connected to the output terminal of the source device comprises based on a ground second pin from among the plurality of pins being shorted with a first pin from among the plurality of pins and the first pin being grounded, identifying that the output terminal of the source device is connected with the interface.

22. The method of claim 14, wherein the sub-processor determines whether another output terminal of another source device is connected to another interface of the display apparatus in the first state.

23. The method of claim 14, wherein the interface communicates based on a high definition multimedia interface (HDMI) standard.

* * * * *